UNITED STATES PATENT OFFICE.

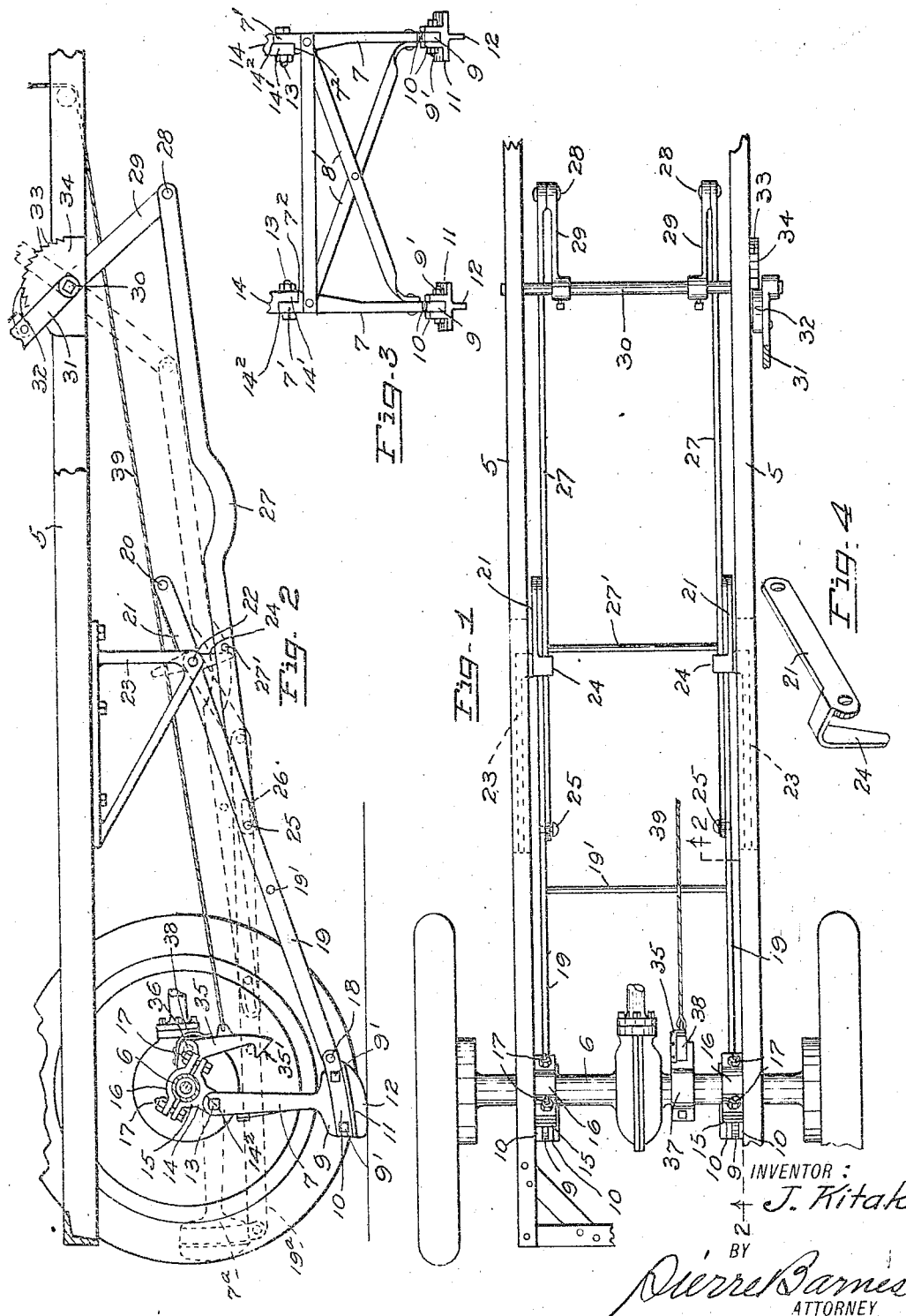

JOSEPH KITAK, OF SEATTLE, WASHINGTON.

ANTISKID DEVICE FOR AUTOMOBILES.

1,238,301.

Specification of Letters Patent.    Patented Aug. 28, 1917.

Application filed November 20, 1915. Serial No. 62,466.

*To all whom it may concern:*

Be it known that I, JOSEPH KITAK, a citizen of the United States, residing at Seattle, in the county of King and State of Washington, have invented certain new and useful Improvements in Antiskid Devices for Automobiles, of which the following is a specification.

This invention relates to anti-skid devices for automobiles; and its main object is the provision of simple and inexpensive apparatus of this character which may be readily applied to cars of ordinary construction, be convenient to operate and efficient in use.

A further object is to provide means for elevating the rear end of an automobile to raise the running gear from the ground in order to repair the same or for replacing tires.

The invention consists in the novel construction, adaptation and combination of devices, as will be hereinafter described and claimed.

In the accompanying drawings, Figure 1 is a fragmentary plan view of an automobile chassis and running gear, with an embodiment of my invention applied thereto. Fig. 2 is a view partly in side elevation and partly in vertical section, said section being taken through 2—2 of Fig. 1. Fig. 3 is a rear elevational view of the swinging frame attached to the hangers which are shown partly broken away. Fig. 4 is a perspective view of one of the links shown in Figs. 1 and 2.

The reference numeral 5 designates the side rails of an automobile body, and 6 is the tubular housing for the rear axle suspended from said body by the usual springs, not shown.

In carrying out my invention, I provide a rigid frame (Fig. 3) comprising legs 7 secured in spaced relations by tie members 8. The lower end of each of the frame legs is formed with a foot 9 adapted to fit between two flanges 10 which extend upwardly from the sole plate 11 of a shoe, and having a rocker-shaped rib 12 at the bottom.

$9^1$ indicate bolts for detachably securing the shoes to the frame legs 7. At the upper end of each leg the frame is hingedly connected by bolts 13 to arms 14 provided on clamping members 15 which, with their complementary members 16 are secured to the axle housing 6 by means of bolts 17.

The arms 14 and the upper ends of the respective legs 7 are formed to provide overlying portions $14^1$ and $7^1$ with arcuate extremities which seat against concave bearing surfaces provided at the shoulders $14^2$ and $7^2$ of the respective parts.

Secured by pivotal pins such as 18 to the forward ends of the shoe flanges 10 are bars 19. The forward ends of these bars are connected by pins 20 with the free ends of links 21 whose other ends are pivotally connected by pins 22 to rigid bracket supports 23 secured to body rails 5.

As best shown in Fig. 4, the link 21 is provided in offset relation therewith with a downwardly directed finger 24, the function of which will be presently explained.

Intermediate their lengths, the bars 19 are provided with studs 25 which extend into slots, as indicated by 26, provided in the rear ends of drag-bars 27. The forward ends of the latter are connected by pins 28 with arms 29 of a rocker shaft 30 having bearings in the chassis or other suitable place on the car in proximity to the driver's seat. Secured to shaft 30 is an operating arm 31 which carries a pawl 32 engageable in serrations 33 of a relatively stationary sector-plate 34.

$19^1$ and $27^1$ are transversely arranged rods for securing the respective bars 19 and 27 with each other.

35 represents a hook depending by a pivotal pin 36 from a clamp 37 which is secured to the axle housing 6. The bill of said hook is formed to provide an inclined face $35^1$ which, upon being encountered by the rod $19^1$ in the elevation of the same, will swerve the hook forwardly in opposition to a spring 38.

When the referred to rod is sufficiently raised, the spring will assert itself to cause the hook to engage the referred to rod for supporting the frame in its inoperative position. To release the frame, a trip cable or rope 39 is connected to the hook 35, as shown in Fig. 2, and extends to within the reach of the driver.

When unemployed, the several parts of the apparatus are held by the hook 35 to occupy the positions in which they are represented by broken lines in Fig. 2. More particularly, the frame, as indicated by $7^a$, held up back of the rear axle by means of the bars 19 in $19^a$ position when so held by the hook engaging the rod $19^1$.

To cause the apparatus to become operative, the hook 35 is, by a pull on trip-line 39, disengaged from the rod 19¹, whereupon the weight of the frame and the shoes will effect the descent of the latter to the ground. The operator then, through the instrumentality of the handle arm 31, causes the shaft 30 to swing the arm 29 forwardly, and thereby impart, through the bars 27 and 19, a forward pull to the frame and render the shoe ribs 12 effective.

When the bars 19 are thrust forward, the links 21 will ultimately be swung thereby into the position shown in Fig. 2, whereat the links and the axes of the referred to bars will be substantially in a plane, which extends from the axes of the pins 18 to the pins 20 to lock the frame against rearward movement and cause the strains to be withstood by the support 23 instead of by the drag-bars 27.

To displace the bars 19 and links 21 from such locking position, the drag-bars 27 are thrust rearwardly by the operator, resulting in the rod 27¹ first engaging the link fingers 24 to swing the forward ends of the links and bars 19 downwardly so that when the studs 25 encounter the rear ends of the respective slots 26, the bars 19 are free to be moved rearwardly.

When it is desired to use the frame for elevating the rear end of the automobile, the frame is swung downwardly against the ground and then backing the machine.

The effective length of the frame legs may be regulated by rotatably adjusting the clamps 15—16 upon the axle housing to present the arms 14 in selected angular relations to the axis of said housing.

What I claim is—

1. In apparatus of the class described, the combination with a vehicle having a body and a housing for the rear axle, of brackets secured to said body, clamps secured to said housing, a frame hingedly connected to said clamps and provided at its free end with shoes, links pivotally connected with said brackets and provided with offset finger elements, bars pivotally connected from its ends to said frame and with the respective links, drag-bars connected with the aforesaid bars, means provided on the drag-bars and engageable with the link fingers for imparting initial movements to the links when the apparatus is to be rendered inoperative, and manually operable means for influencing said bars to move the frame into or out of operative positions.

2. In apparatus of the class described, the combination with a vehicle having a body and a housing for the rear axle, of brackets secured to said body, clamps secured to said housing, a frame hingedly connected to said clamps and provided at its free end with detachable shoes, links pivotally connected with said brackets and provided with offset finger-elements, bars pivotally connected from its ends to said frame and with the respective links, drag-bars connected for limited independent movements with the aforesaid bars, means provided on the drag-bars and engageable with the link fingers for imparting initial movements to the links when the apparatus is to be rendered inoperative, and manually operable means for influencing said bars to move the frame into or out of operative positions.

Signed at Seattle, Washington, this 5th day of November, 1915.

JOSEPH KITAK.

Witnesses:
 E. PETERSON,
 HORACE BARNES.